(12) United States Patent
Chen

(10) Patent No.: US 8,059,293 B2
(45) Date of Patent: Nov. 15, 2011

(54) METHOD AND APPARATUS FOR SWITCHING HIGH-SPEED FACSIMILE TO ORDINARY FACSIMILE

(75) Inventor: Wei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 477 days.

(21) Appl. No.: 11/780,763

(22) Filed: Jul. 20, 2007

(65) Prior Publication Data

US 2008/0018945 A1 Jan. 24, 2008

Related U.S. Application Data

(63) Continuation of application No. PCT/CN2006/000081, filed on Jan. 19, 2006.

(30) Foreign Application Priority Data

Jan. 21, 2005 (CN) .......................... 2005 1 0032973

(51) Int. Cl.
*G06F 3/12* (2006.01)
*H04N 1/46* (2006.01)
(52) U.S. Cl. ...................................... 358/1.15; 358/500
(58) Field of Classification Search ................. 358/1.15, 358/400, 500, 407, 426.15, 426.16, 436, 358/442; 709/201, 213, 227, 230
See application file for complete search history.

(56) References Cited

U.S. PATENT DOCUMENTS

| 5,949,861 | A | * | 9/1999 | Chan et al. | ............... 379/100.17 |
| 6,163,601 | A | * | 12/2000 | Kawaguchi | ............... 379/100.17 |
| 7,623,273 | B1 | * | 11/2009 | Garakani et al. | .............. 358/407 |
| 2002/0001373 | A1 | * | 1/2002 | Sakurai | ..................... 379/100.12 |
| 2002/0080932 | A1 | * | 6/2002 | Yoshida et al. | ............ 379/93.01 |
| 2002/0164002 | A1 |   | 11/2002 | Beadle et al. | |
| 2004/0136029 | A1 |   | 7/2004 | Zhang et al. | |
| 2006/0067301 | A1 | * | 3/2006 | Fruth et al. | ..................... 370/352 |

FOREIGN PATENT DOCUMENTS

| CN | 1399446 A | 2/2003 |
| CN | 1610372 A | 4/2005 |
| EP | 0 412 461 A2 | 2/1991 |
| EP | 1 119 182 A2 | 7/2001 |
| JP | 59 086370 | 5/1984 |

(Continued)

OTHER PUBLICATIONS

Written Opinion of the International Searching Authority in corresponding PCT Application No. PCT/CN2006/000081 (Mar. 30, 2006).

(Continued)

*Primary Examiner* — Gabriel Garcia
(74) *Attorney, Agent, or Firm* — Leydig, Voit & Mayer, Ltd

(57) ABSTRACT

A method applied to T.38 gateway for making high-speed facsimile fall back to ordinary facsimile, including: detecting a call menu signal from a calling high-speed facsimile machine: intercepting the call menu signal when the call menu signal containing high-speed facsimile service information is detected; detecting a digital identification signal from a called high-peed facsimile machine; setting V.8BIT in the digital identification signal to zero. The method of the invention is a reliable and effective method for identifying a facsimile service and making a high-speed facsimile process fall back to an ordinary facsimile process.

15 Claims, 7 Drawing Sheets

FOREIGN PATENT DOCUMENTS

| | | | |
|---|---|---|---|
| JP | 63 236445 A | 3/1988 | |
| JP | 10-290351 A | 10/1998 | |
| JP | 2000 201235 | 7/2000 | |

OTHER PUBLICATIONS

"T.30—Procedures for document facsimile transmission in the general switched telephone network," Series T: Terminals for Telematic Services, Jul. 2003, International Telecommunication Union, Geneva, Switzerland.

"T.38—Procedures for real-time Group 3 facimile communication over IP networks," Series T: Terminals for Telematic Services, Apr. 2004, International Telecommunication Union, Geneva, Switzerland.

"V.8—Procedures for starting sessions of data transmission over the public switched telephone network," Series V: Data Communication Over the Telephone Network, General, Nov. 2000, International Telecommunication Union, Geneva, Switzerland.

"V.21—300 Bits per second Duplex Modem Standardized for use in the General Switched Telephone Network," 1998, International Telecommunication Union, Geneva, Switzerland.

\* cited by examiner

| preamble | Synchronization | Call function | Modulation | Protocol | PSTN access | PCM modem |

Fig. 4

METHOD AND APPARATUS FOR SWITCHING HIGH-SPEED FACSIMILE TO ORDINARY FACSIMILE

Cross-References to Related Applications

The present application is a continuation of PCT Application No. PCT/CN2006/000081. filed on Jan. 19, 2006, which claims a priority to Chinese Patent Application No. 200510032973.4, filed on Jan. 21, 2005. All of these applications are incorporated herein by reference for all purposes.

FIELD OF THE INVENTION

The present invention relates to network facsimile technologies, and more particularly, to a method applied to T.38 gateway for making high-speed facsimile tfall back to ordinary, facsimile.

BACKGROUND OF THE INVENTION

With the development of INTERNET technologies, IP facsimile technologies have also been developed rapidly. In the facsimile network structure shown in FIG. 1a, the facsimile machines each accesses the IP (Internet Protocol) network via respective gateways corresponding to the facsimile machines to realize facsimile communication. However, for a simple network, the gateways and facsimile machines may be connected only via telephone lines, without via telephone switching network. Real-time IP facsimile may be implemented in two modes, i.e., pass-through mode and relay mode. The relay mode is a facsimile conforming to T.38 protocol. Because resistance to network damage is poor in the pass-through mode, media gateways or relay gateways usually support facsimile in T.38 protocol. When a facsimile machine initiates a call, a gateway only takes the service as an ordinary telephone call, without identifying whether the call is a facsimile service; and signals are all transmitted in voice mode. The gateway considers that a facsimile service is present and starts to transfer facsimile data in the mode specified in T.38 protocol only when the gateway detects a special signal from the facsimile machine.

At present, there are mainly two types of facsimile machines on the market: one is ordinary facsimile machine with a highest transmission rate of 14400 bps, and the other is high-speed facsimile machine with a highest transmission rate of 33600 bps. These two types of facsimile machines conform to different facsimile processes, and their signal sending mode and operation mode are also different. The former conforms to T.30 protocol, while the latter conforms to the AnnexF part of the T.30 protocol and V.8 protocol. Generally, gateway products on the market can detect signals of an ordinary facsimile machine. With the market occupancy of high-speed facsimile machines becoming larger and larger, it is also required that signals of a high-speed facsimile machine may be detected correctly.

At present, the highest transmission rate supported by most of the gateway products which support facsimile in T.38 mode is usually 14400 bps. A method of performing a V.21 (H)FLAG detection on a PSTN-side signal is used. Specifically, it is determined whether it is a facsimile service by detecting whether there is a FLAG signal in a receive Digital Identification Signal (DIS). A basic calling process of an ordinary facsimile machine may be understood with reference to FIG. 1. After a facsimile service is initiated, the sending facsimile machine sends a Calling tone (CNG) signal. The receiving party sends a called station identification (CED) signal and a DIS. The sending end sends a Digital Command Signal (DCS) as a response after detecting the DIS signal and then starts training and sending facsimile pages.

The DIS signal is modulated in V.21(H) modulation, the central frequency of its carrier frequency is 1750 Hz, and bit0 is modulated into a signal of 1850 Hz and bit1 is modulated into a signal of 1650 Hz. The content of the DIS signal is constructed with FLAGs (0×7e) for 1 second and a frame signal. Gateways generally perform V.21(H) detection. If it is determined that the demodulated data is a FLAG signal, it indicates that a facsimile service is present. The transmission rate of data modulated in V.21 will be 300 bps, equivalent to sending about 37 0×7e, because FLAGs are sent continuously for 1 second. Therefore, a gateway usually determines that a facsimile signal is present after detecting several 0×7e, and then switches to T.38 facsimile mode.

The method may correctly detect the FLAG signal of an ordinary facsimile machine. However, when the sending and receiving facsimile machines arc both high-speed facsimile machines, no signal in V.21(H) FLAG form is sent, because the facsimile process for the high-speed facsimile machines is totally different from that of ordinary facsimile machines, and the calling process conforms to V.8 protocol. As a result, the gateway cannot detect the FLAG signal, and thus cannot switch from voice mode to facsimile mode. A basic process otf higlh-speed facsimile is as shown in FIG. 2. The sending end sends a Calling tone (CNG) signal, and continuously sends Call Menu (CM) signals upon receipt of an answer tone with phase reversals (ANSam) signal fed back by the receiving end. If the receiving end sends a Joint Menu (JM) signal soon after it detects two complete CM signals, the sending party responds to the JM signal with a CM terminator (CJ) signal, and then the process enters training and facsimile procedures.

The CM is a signal modulated by V.21(L), and the central frequency of its carrier frequency is 1080 Hz. The CM signal contains parameters such as modulation rate of a facsimile machine, etc., and the CJ indicates that the sending of the CM signal completes. The ANSam is a single-frequency signal of 2100 Hz. Its longest transmission is 4 seconds, and its phase is reversed once every 450 nms. The JM is a signal modulated by V.21(H), which indicates that an available CM signal has been received. Although the JM is modulated using V.21(H), it does not contain the V.21(H) FLAG signal of an ordinary facsimile.

Because signals in V.21(H) FLAG form are not present in a calling procedure of a high-speed facsimile, the gateway cannot switch from voice mode to facsimile mode. Thus, a facsimile by a high-speed facsimile machine cannot be transferred via a gateway.

At present, after the market share of high-speed facsimile machines incretises, some gateways also employ such a method for detecting a facsimile signal: detecting the ANSam and the V.21(H) FLAG at the same time. When a gateway detects an ANSam signal, the gateway does not package the voice data. If no available V.21(H) FLAG signal is received in a time-out period for the ANSam signal, the gateway will determine that the service is a voice service and starts packaging. If a V.21(H) FLAG signal is detected in the time-out period, which indicates that a facsimile service is present, the gateway switches to T.38 state and sets V.8BIT in the DIS signal to zero.

In this method, the ANSam signal is intercepted. In fact, the high-speed tacsliile process is converted to an ordinary facsimile process by force. The sending facsimile machine cannot send a CM signal because it cannot receive an available ANSam signal. After sending the ANSam signal, the receiving facsimile machine sends a DIS signal because it cannot receive the CM signal from the sending facsimile machine. Thus, the facsimile process will proceed as ain ordinary facsimile process.

In addition to voice and facsimile, the media or relay gateway sevices also include MDOEM service. A MODEM calling initiation process also conforms to V.8 protocol, which is similar to the calling process of high-speed facsimile. For the MODEM service, the above method will cause adverse influence and training failure as well as disconnection dule to the interception of ANSam signal in the method.

SUMMARY OF THE INVENTION

The present invention is to provide a method for switching high-speed facsimile to ordinary facsimile. In view of the drawbacks of the prior art, the method may detect a facsimile identification signal correctly and reliably, and at the same time, distinguish between a high-speed facsimile and a MODEM service, without any influence laid on the MDEM service.

According to one aspect of the present invention, there is provided a method for switching high-speed facsimile to ordinary facsimile. The method includes:

detecting a call menu signal from a calling high-speed facsimile machine;

intercepting the call menu signal when the call menu signal containing high-speed facsimile service information is detected;

detecting a digital identification signal from a called high-speed facsimile machine; and setting V.8BIT in the digital identification signal to zero.

According to another aspect of the present invention, there is provided an apparatus for switching high-speed facsimile to ordinary facsimile. The apparatus includes:

a component configured to detect a call menu signal from a calling high-speed facsimile machine, a component configured to intercept the call menu signal when the call menu signal containing high-speed facsimile service information is detected, a component configured to detect a digital identification signal from a called high-speed facsimile machine; and a component to set V.8BIT in the digital identification signal to zero.

According to another aspect of the present invention, there is provided a method for switching high-speed facsimile to ordinary facsimile. The method includes:

detecting ajoint menu signal from a called high-speed receiving facsimile machine, intercepting the joint menu signal when the joint menu signal containing high-speed facsimile service information is detected;

detecting a digital identification signal from the called high-speed facsimile machine: and setting V.8BIT in the digital identification signal to zero.

According to another aspect of the present invention, there is provided an apparitus for switching high-speed facsimile to ordinary facsimile. The apparatus includes:

a component configured to detect a joint menu signal from a called high-speed facsimile machine, a component configured to intercept the joint menu signal when the joint menu signal containing high-speed facsimile service information is detected;

a component configured to detect a digital identification signal from the called high-speed facsimile machine; and a component configured to set V.8BIT in the digital identification signal to zero.

In the method applied to T.38 gateway for making high-speed facsimile fall back to ordinary facsimile provided by the present invention, because the facsimile service is identiflied depending on the detection of V.21(H) FLAG and the detection and interception of CM/JM signals, the method of the invention may detect the high-speed facsimile machine service increasingly used presently, laying no influence on the MODEM service which is similar to the high-speed facsimile calling process. As a result, it is a reliable and available method for identifying a facsimile service and making high-speed facsimile process fall back to ordinary facsimile process.

BRIEF DESCRIPTION OF THE DRAWINGS

FIG. 4 is a schematic diagram showing the structure of a CM signal of a facsimile machine according to an embodiment of the present invention;

DETAILED DESCRIPTION OF THE EMBODIMENTS

Figure 1A:
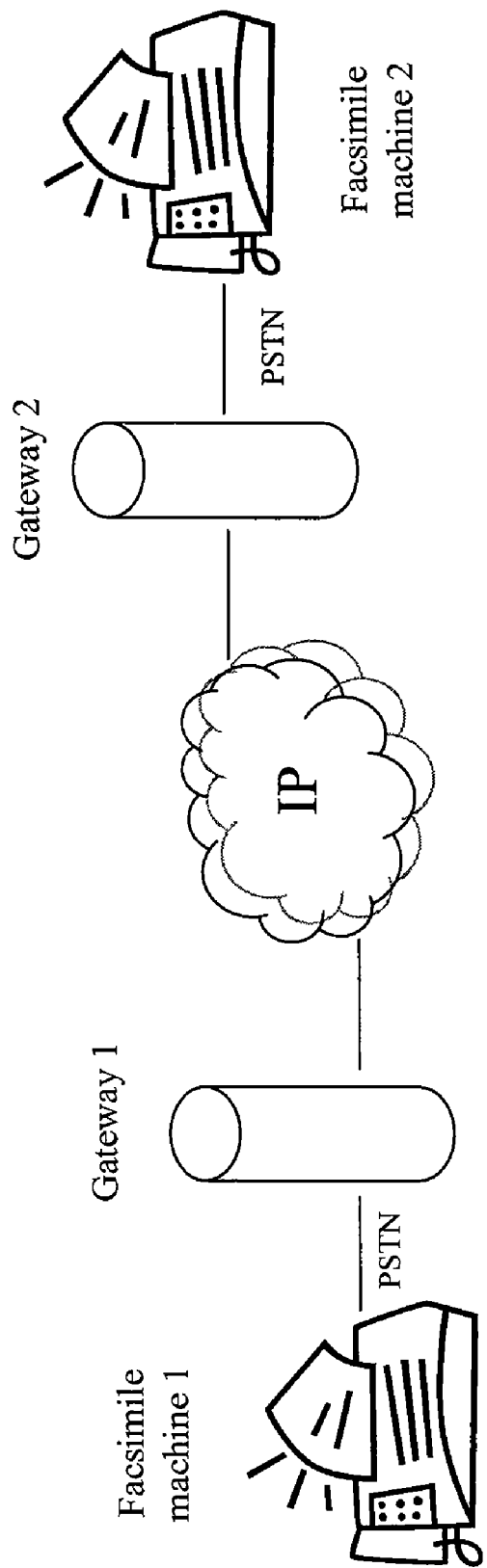
FIG. 1*a* is a schematic diagram showing a facsimile connection of the prior art.
Figure 1:
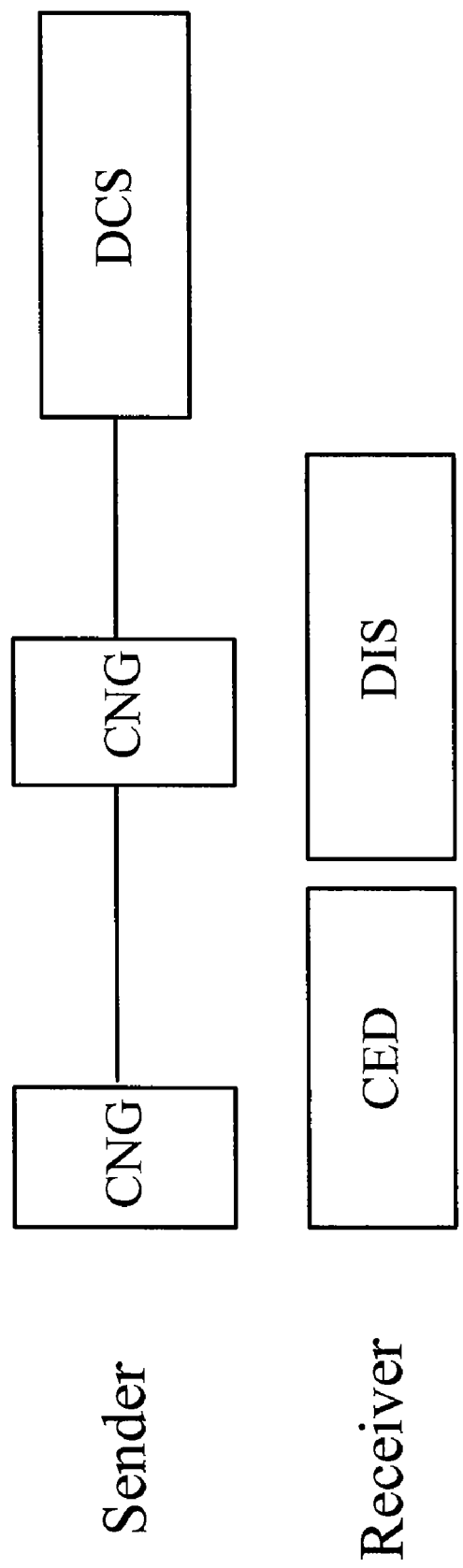
FIG. 1 is a schematic diagram showing the calling process of an ordinary facsilile machine of the prior art.
Figure 2:
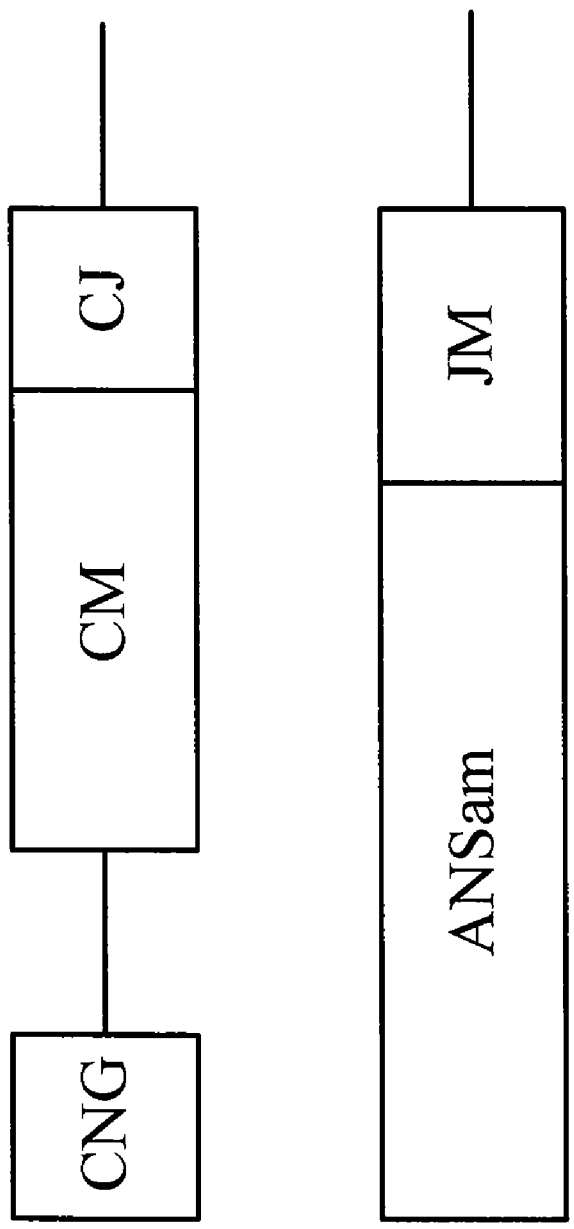
FIG. 2 is a schematic diagram showing the calling process of a high-speed facsimile machine of the prior art.
Figure 3:
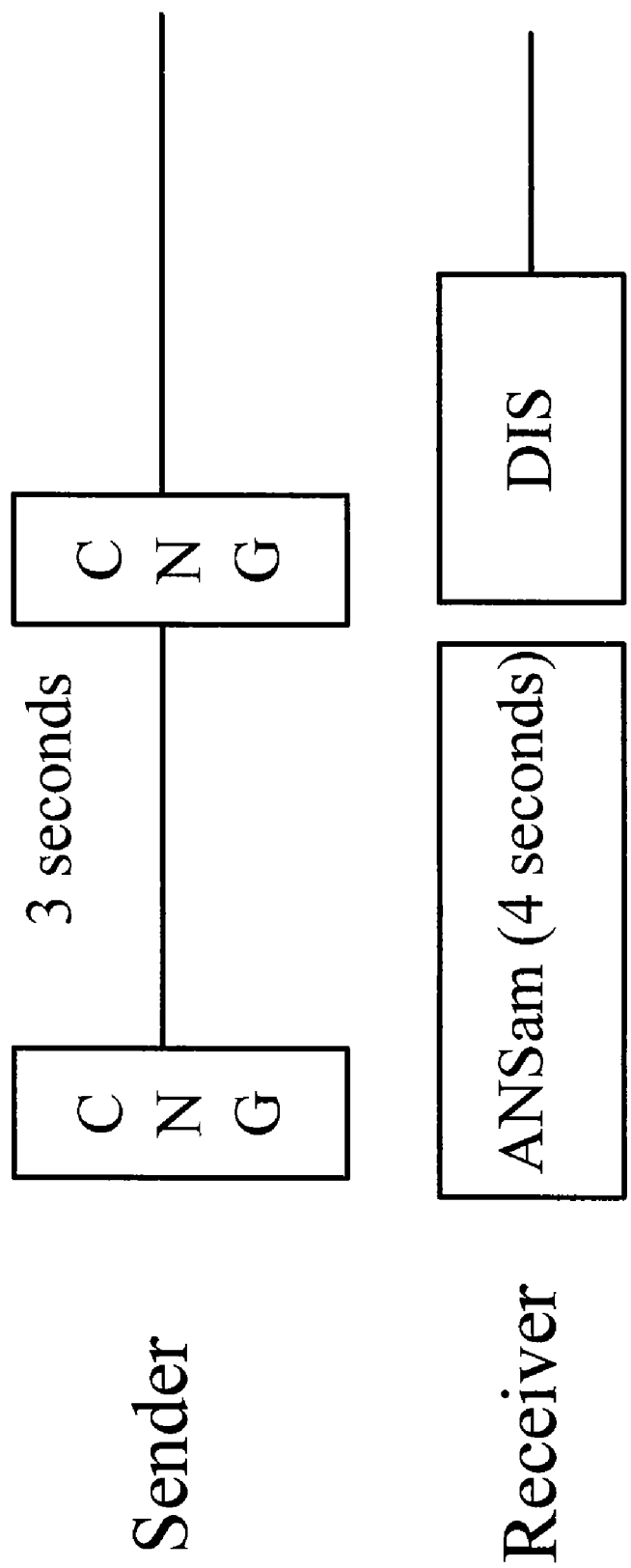
FIG. 3 is a schematic diagram showing the facsimile process of a high-speed facsimile machine of the prior art after an ANSam signal is intercepted when passing through a gateway.

Various preferred embodiments of the invention will be described hereunder in detail.

For presently used T.38 gateways that support a rate of 14400 bps at the highest, the key to correctly identify a facsimile signal lies in that a facsimile machine may send a V.21(H)FLAG signal. This will cause no problem for an ordinary facsimile. However, when a sending party and a receiving party are both high-speed facsimile machines, generally no V.21(H)FLAG signal will be present. Therefore, if it is expected a high-speed facsimile machine operates in T.38 mode, the process for the high-speed facsimile machine should be changed, so that the high-speed facsimile machine may send signals in V.21(H)FLAG form. At the same time, the method for intercepting ANSam cannot be employed so as not to affect the MODEM service.

The method of the invention employs a method of V.21(H) FLAG detection in conjunction with CM/JM signal detection and intercepting CM/JM signals which identifies a facsimile service. By the method, the FLAG of a DIS signal is identifled, and at the same time, it may be identified whether CM/JM signals from a high-speed facsimile machine is present. The special processing on the CM/JM signals may make a high-speed facsimile process fall back to an ordinary facsimile process, so that a high-speed facsimile machine may send out a DIS signal. The existing gateways have generally employed the detection on V.21(H)FLAG, which has also been described previously in the prior art. The key of the invention, i.e., the detection aniid interception of CM/JM signals, will be described hereunder.

In the calling procedure of a most basic high-speed facsimile process, once at training procedure is started, the subsequent signals are all the signals of a high-speed process, and the high-speed facsimile process cannot be changed to an ordinary facsimile process any longer. Moreover, the previous CM/JM signals also carry some parameters related to facsimile/MODEM. FIG. 4 shows a schematic diagram of the construction of a CM signal. The field in each block is constructed with a 10-BIT data in asynchronous-mode. "Preamble" and "synchronization" are synchronization identification of the signal. "Call function" contains facsimile/MODEM-related information, in which a BIT content of "0 1000 0001 1" or "0 1000 0101 1" indicates a facsimile service, and a BIT content of "0 1000 0011 1" indicates a MODEM service.

After the high-speed facsimile service of the invention is initiated, the sending end sends a CNG signal, and the receiving end sends an ANSam signal. When the sending end detects that the ANSam signal is valid, it sends a CM signal. When it is detected that the "call function" in the CM signal contains a facsimile service, the sending-end gateway intercepts signals after this moment, and no data will be packaged and sent to the IP network in voice state. Thus, the high-speed receiving facsimile machine cannot send out a JM signal because it cannot receive a complete CM signal via the receiving-end gateway. After the sending of the ANSam signal times out, the high-speed receiving facsimile machine starts to send a DIS signal. The sending paraty stops the sending of the CM and restarts the sending of a CNG (or a CI), because the sending ot the CM times out and no JM signal is received by the sending party. After the receiving party, i.e., the high-speed receiving facsimile machine, sends the DIS signal, the receiving-end gateway receives the FLAG in the DIS signal first, and informs a soft switching device of the facsimile detection event. After the gateways at the two ends receive a state switching command from the soft switching device, the channel will be switched to be in T.38 mode. At the same time, the receiving-end gateway sets the V.8BIT of the DIS signal to zero in T.38 mode. Thus the process may enter an ordinary facsimile process, and the sending party continues with a DCS signal. Or, the receiving-end gateway directly switches to T.38 state when the FLAG ofthe DIS is detected, without informing the soft switching device; the sending-end gateway also switches the channel to be in T.38 state upon the receipt of a data packet packaged in T.38 from the IP side.

Figure 5:
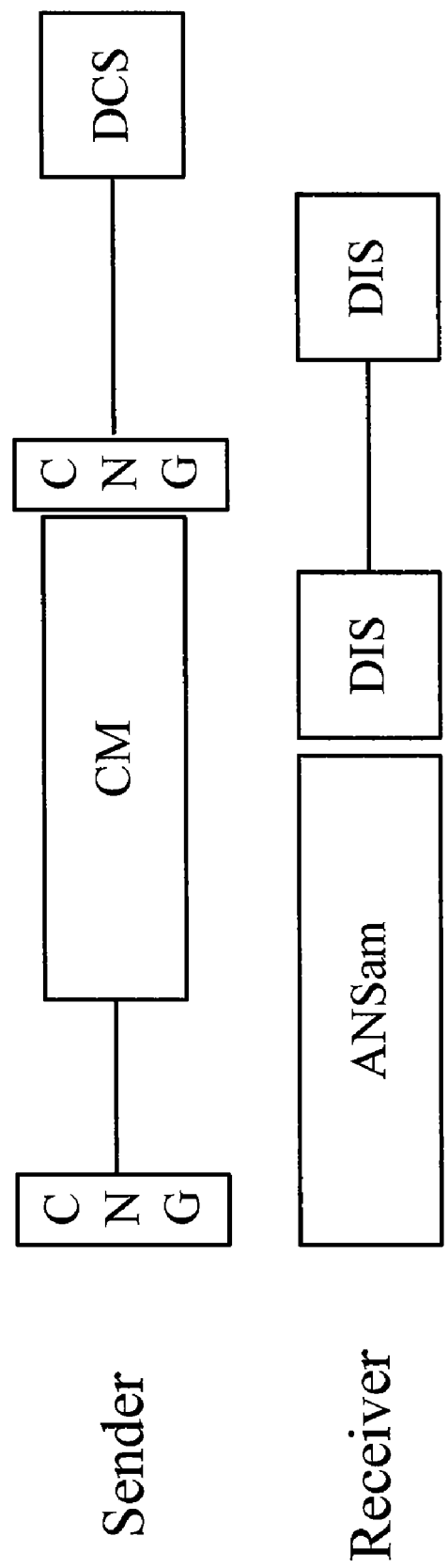
FIG. 5 is a schematic diagram showing the process of making a high-speed facsimile process fall back to an ordinary facsimile process according to a first preferred embodiment of the present invention.

The calling process is as shown in FIG. 5. When the sending end sends a CNG signal, the receiving end sends an ANSam signal. When detecting that the ANSam signal is valid, the sending end sends a CM signal. When the receiving-end gateway detects that the "call function" in the CM signal contains a MODEM service, no processing will be made on the signal. Thus, the MODEM service will proceed without being affected. The CM is a signal sent by a high-speed sending facsimile machine. If the sending-end gateway does not support the detection of a CM signal, the CM signal will be transferred to the high-speed receiving facsimile machine passing through the receiving-end gateway. Upon receipt of a complete CM signal, the high-speed receiving facsimile machine responds with a JM signal, and the high-speed process will proceed. To avoid the case in which the process cannot be reliably switched to the ordinary facsimile process when one of the sending-end gateway and the receiving-end gateway does not support the detection of a CM signal, it is also required to detect and intercept the JM signal. The JM signal has the same parameters as those of the CM signal, and also contains parameters related to facsimile/MODEM service, which is a confirmation for parameters such as rate and so on.

Figure 6:
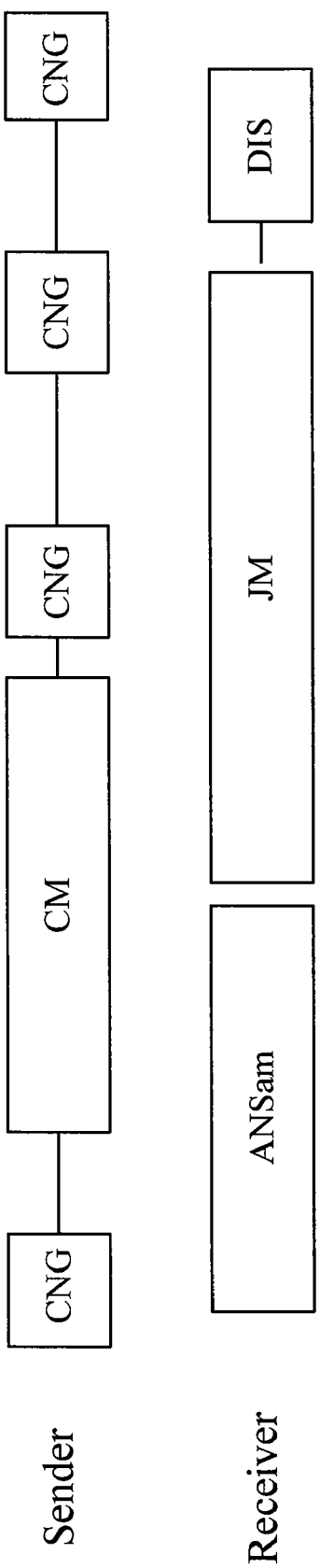
FIG. 6 is a schematic diagram showing the process of making a high-speed facsimile process fall back to an ordinary facsimile process according to a second preferred embodiment of the present invention.

As shown in FIG. 6, the detection process of a JM signal is as follows: alter a facsimile service is initiated, the sending end sends a CNG signal; if the sending end receives an ANSam signal fiom a remote end, the sending end sends a CM signal; and then the high-speed receiving facsimile machine responds with a JM signal. If the receiving-end gateway detects that the JM signal is present on the PSTN side and the content of the field "call function" is a facsimile service, no data will be packaged and sent to the IP network in voice state from this moment on, and the signals after this moment will be intercepted. As a result, the high-speed sending facsimile machine cannot send a training signal, for it cannot receive a complete JM signal; instead, after the sending of the CM times out, the high-speed sending facsimile machine restarts to send a CNG signal, or a CI. Because the high-speed receiving facsimile machine has not received a training signal, it starts to send a DIS signal after the sending of JM times out. Subsequently, through detecting the FLAG signal of the DIS signal, the receiving-end gateway may switch the channel state to facsimile state and sets V.8BIT to zero. Thus, the process enters an ordinary facsimile process.

In the method of the invention, in voice state, V.21(H) and V.21(L) detections are performed on a line signal simultaneously. V21(H) detection has two functions: detecting whether a signal in V.21(H)FLAG form is present, and detecting whether a JM signal is present. V.21(L) detection may identify the CM signal of a high-speed facsimile machine. The method of V.21(H)FLAG detection has been illustrated in the above description of the prior art, and the key of the invention, i.e., CM/JM detection and interception, will be described hereunder.

First of all, it is determined whether a facsimile service is present in a CM/JM signal via V.21(L) and V.21(H) detections. CM signal is a signal modulated by V.21(L) with FSK modulation, with the central frequency of its carrier frequency as 1080 Hz, and bit0 is modulated using a signal of 1180 Hz and bit1 is modulated using a signal of 980 Hz. Contents of the CM signal are constructed in asynchronous mode. JM is a signal modulated by V.21(H), with the central frequency of its carrier frequency as 1750 Hz, and bit0 is modulated using a signil of 1850 Hz and bit1 is modulated using a signal of 1650 Hz. Contents of the JM signal are the same as those of the CM signal, except that the modulation mode is different from that of the CM signal.

After a voice channel is initiated, signals on the line start to be demodulated with V.21(L) and V.21(H) modulations at the same time. As described above, V.21(H) detection mainly has two objects: detecting whether a signal in V.21(H)FLAG form is present, and detecting whether a JM signal is present. The form of the V.21(H) FLAG signal is a field "0111 1110" sent repeatedly (synchronous mode). If the facsimile machine sends a JM signal, no field content in the form of V.21(H) FLAG will be contained in the signal.

In the method of the invention, the gateway demodulates a PSTN-side signal with V.21(L) and V.21(H) modulations. When the following contents are detected successively, it may be determined that a high-speed facsimile service is present:

(1) PREAMBLE signal: 1 1111 1111 1

(2) Synchronization signal: 0 0000 0111 1

(3) facsimile information contained in the field "call function": 0 1000 0001 1 (sending a facsimile) or 0 1000 0101 1 (receiving a facsimile)

When the above bits are detected successively, it may be determined that a high-speed facsimile service is present. In another instance, signals in other customized forms also may be employed. When a high-speed facsimile service is present, the signal will be intercepted and the facsimile process will be changed, as described hereunder.

In the method of the invention, if the sending-end gateway detects that a CM signal is present on the PSTN side and the content of the field "call function" is a facsimile service, in voice state, the sending-end gateway will no longer package and send PSTN-side data to the IP network from this moment on. Thus, the remote end facsimile machine, i.e., the high-speed receiving facsimile machine located on the receiving end, cannot send a JM, because it cantllot receive a complete CM signal; instead, the remote end facsimile machine starts to send a DIS signal after the sending of the ANSam times out.

Similarly, if the receiving-end gateway detects that a JM signal is present on the PSTN side and the field "call function" of the signal contains facsimile service, in voice state, the gateway will no longer package and send PSTN-side data to the IP network from this moment on. Thus, the remote end facsimile machine cannot send a CJ signal and a training signal, because it cannot receive a complete JM signal; instead, the remote end facsimile machine restarts to send a CNG signal after the sending of the CM times out. The high-speed receiving fticsimile machine starts to send a DIS signal after the sending of the JM times out, because it has not received a training signal.

After entering the ordinary facsimile process, the receivking-end gateway switches to T.38 state. The detection of V.21(H)FLAG form still proceeds after the signal interception. After the high-speed receiving facsimile machine sends a DIS signal, the V.21(H)FLAG signal of the DIS may be detected. Then, the receiving-end gateway may switch to T.38 mode, and set V.8BIT flag to zero. Subsequently, the sending end and the receiving-end gateway may operate in T.38 mode.

In conclusion, the invention may ensure that when a facsimile service is present on the channel, it may be correctly switched to facsimile mode, and the high-speed facsimile process may be changed into an ordinary facsimile process that supports a rate of 14400 bps at the highest. At the same time, no influence will be laid on the MODEM service.

What is claimed is:

1. A method for switching high-speed facsimile to ordinary facsimile, wherein the method comprises:
    detecting, by a sending end gateway, a call menu signal from a calling high-speed facsimile machine;
    intercepting, by the sending end gateway, the call menu signal when the call menu signal containing high-speed facsimile service information is detected, so that the call menu signal cannot be transmitted to a receiving facsimile machine;
    detecting, by a receiving end gateway, whether a digital identification signal carries a FLAG signal from a called high-speed facsimile machine;
    switching, by the receiving end gateway, a channel to T.38 mode when the FLAG signal of the digital identification signal is detected;
    setting, by the receiving end gateway, V.8BIT in the digital identification signal to zero to enter an ordinary facsimile process.

2. The method according to claim 1, wherein packaging and sending data are stopped after intercepting the call menu signal.

3. The method according to claim 1, wherein a normal modem service process is performed when the call menu signal containing modem service information is detected.

4. The method according to claim 1, wherein the digital identification signal is sent by the called high-speed facsimile machine when sending of an answer tone with ANSam signal times out.

5. An apparatus for switching high-speed facsimile to ordinary facsimile, wherein the apparatus comprises:
    a component configured to detect a call menu signal from a calling high-speed facsimile machine,
    a component configured to intercept the call menu signal when the call menu signal containing high-speed facsimile service information is detected;
    a component configured to detect a digital identification signal from a called high-speed facsimile machine;
    a component configured to switch the channel to T.38 mode when the FLAG of the digital identification signal is detected;
    a component to set V.8BIT in the digital identification signal to zero, thus to enter an ordinary facsimile process.

6. The apparatus according to claim 5, wherein the component configured to intercept the call menu signal is further configured to stop packaging and sending data after intercepting the call menu signal.

7. The apparatus according to claim 5, wherein the component configured to detect a call menu signal from a calling high-speed facsimile machine performs a normal modem service process when the call menu signal containing a modem signal is detected.

8. A method for switching high-speed facsimile to ordinary facsimile, wherein the method comprises:
    detecting, by a gateway, a joint menu signal from a called high-speed receiving facsimile machine,
    intercepting, by the gateway, the joint menu signal when the joint menu signal containing high-speed facsimile service information is detected;
    detecting, by the gateway, a digital identification signal from the called high-speed facsimile machine;
    switching, by the gateway, the channel to T.38 mode when the FLAG of the digital identification signal is detected;
    setting, by the gateway, V.8BIT in the digital identification signal to zero, thus to enter an ordinary facsimile process.

9. The method according to claim 8, wherein packaging and sending data are stopped after intercepting the joint menu signal.

10. The method according to claim 8, wherein a normal modem service process is performed when the joint menu signal containing modem service information is detected.

11. The method according to claim 8, wherein the digital identification signal is sent by the called high-speed facsimile machine when sending of the joint menu signal times out.

12. An apparatus for switching high-speed facsimile to ordinary facsimile, wherein the gateway comprises:
    a component configured to detect a joint menu signal from a called high-speed facsimile machine,
    a component configured to intercept the joint menu signal when the joint menu signal containing high-speed facsimile service information is detected;
    a component configured to detect a digital identification signal from the called high-speed facsimile machine;
    a component configured to switch the channel to T.38 mode when the FLAG of the digital identification signal is detected;
    a component configured to set V.8BIT in the digital identification signal to zero, thus to enter an ordinary process.

13. The apparatus according to claim 12, wherein the component configured to intercept the joint menu signal is further configured to stop packaging and sending data after intercepting the joint menu signal.

14. The apparatus according to claim 12, wherein the component configured to detect a joint menu signal from a called high-speed sending facsimile machine performs a normal modem service process when the joint menu signal containing a modem signal is detected.

15. A method for switching high-speed facsimile to ordinary facsimile, comprising:

detecting, by a gateway, a call menu signal from a calling high-speed facsimile machine;

intercepting, by the gateway, the call menu signal when the call menu signal containing high-speed facsimile service information is detected, so that the call menu signal cannot be transmitted to a called facsimile machine;

detecting, by the gateway, whether a digital identification signal carries a FLAG signal from a called high-speed facsimile machine;

switching, by the gateway, a channel to T.38 mode when the FLAG signal of the digital identification signal is detected;

setting, by the gateway, V.8BIT in the digital identification signal to zero to enter an ordinary facsimile process.

* * * * *